UNITED STATES PATENT OFFICE 2,061,570

IMPREGNATED FIBROUS MATERIAL

Per K. Frolich, Roselle, and Peter J. Wiezevich, Elizabeth, N. J., assignors to Standard Oil Development Company, a corporation of Delaware No Drawing. Application July 19, 1933, Serial No. 681,164

19 Claims. (Cl. 91—68)

This invention relates to the impregnation of fibrous materials with certain polymerized compounds in order to improve the resistance of said fibrous materials to water, oxidation, fungus and termite attacks, corrosion and the like, as well as to impart other desirable properties as will be hereinafter disclosed.

These polymerized compounds are in the neighborhood of 1,000 to 10,000 molecular weight. They possess high viscosities and are soluble in mineral oils, benzol, carbon tetrachloride, turpentine and other solvents. They are obtained by polymerizing such unsaturated hydrocarbons as isobutylene. The polymerization of such compounds, for example, isobutylene, is conducted at a temperature below −10° C. with inorganic halide catalysts such as boron fluoride, aluminum chloride, titanium chloride, stannic chloride, tin or aluminum foil treated with hydrogen chloride, etc.

The object of this invention is to impregnate fibrous materials with the above polymer so as to improve the resistance of such fibrous materials to water, oxidation, fungus attacks, etc.

It has been found that when fibrous materials are impregnated with these polymers, the fabric is made waterproof and resistant to acid and alkalies. Fabrics impregnated with these polymers are superior to those waterproofed by rubber in that these polymers do not oxidize on standing in air and harden or finally crack, losing their water-repellent property. Such a property is especially desirable in the production of automobile tops, raincoats, waterproof canvas, shower bath curtains, etc.

In the present invention it is preferred to impregnate the fibrous material with a solution of the polymer in a volatile solvent such as naphtha, benzol, carbon tetrachloride, turpentine, etc. The concentration and molecular weight of the impregnating agent dissolved in the solvent is determined by the use to which the impregnated material is subjected. Where tackiness of the surface of the finished article is a desirable feature, 20% or more of a solution of about 1,000 to 5,000 molecular weight polymer is used to impregnate the material. Where it is only desired to waterproof the material and tackiness is to be avoided, a solution of less than 20% of polymer of from 5,000 to 10,000 molecular weight is used. Ordinarily, a dilute solution of say about 5 to 10% is sufficient. Different methods of impregnation may be used. Where it is desired to impregnate an article through its entire mass, the article is immersed in a solution of the polymer and allowed to soak in with or without the application of pressure. Where only a surface coating is desired, the surface of the article is painted with a brush. The solvent may be evaporated off after impregnation by application of heat, (vacuum may also be used) leaving the polymer coating to protect the fibers. Upon evaporation of the solvent, a tackiness of the impregnated material is first noted but this disappears to a great extent in a short period of time, especially where a less concentrated solution of a higher molecular weight polymer that is over 5,000 molecular weight has been used. Suitable dyes, resins, fungicides, insecticides, fireproofing agents and the like, may also be dissolved and/or suspended in the same solvent.

Since the polymers also exert a lubricating action upon the fibers, clothes may be improved during dry cleaning operations by the introduction of a small amount of this product, say 0.1 to 1.0% in the dry cleaning fluid. Clothes that have been treated with this polymer hold their shape after pressing better than do the untreated fabrics. More concentrated solutions of the polymer leave a substantial coating upon the surface of the fabric and this property of surface coating a fabric may be used in treating the lower portion of carpets, rugs, etc. in order to prevent slipping, that is, render them non-skidding. For such a purpose, concentrations of 20% and above of the polymer in the solvent are preferred. In the manufacture of waterproof fabrics, more concentrated solutions, such as 20% or more, may be used to advantage by first coating the top of a fabric, for example, canvas, allowing the solvent to partially evaporate and then covering the coated surface with another canvas layer. In such a case, the waterproof layer would be the intermediate one.

This process is also adapted to be used in coating and impregnating other fibrous materials such as paper, wood, leather, wall board, building materials, asbestos, mineral wool, slag wool, cotton, hair, glass wool, "Celotex", "Cellophane", viscose, rayon, and the like, especially where waterproof coatings prepared from these materials are desired. It is especially adaptable for treating cordage that is used on vessels such as sailboats where the ropes are at times immersed in water for prolonged periods of time. Such ropes are made more flexible and do not tend to rot and the use of heavy tarry material is avoided. Where fillers such as cork, coke, or sawdust are used for insulating the walls of a refrigerator, this polymer is especially adapted to be used in coating these materials.

Cloths, mops, etc. which are used for removing dust, dirt, and lint from furniture, floors, automobile bodies, etc., upon being impregnated with these polymerized compounds, are found to be very useful. For example, cheesecloth, saturated with 5% of the polymerized compound, operates exceptionally well in picking up and retaining dust, yet it is easily washed with soap and water without destroying its dust-retaining properties.

The foregoing description is merely illustrative and alternative arrangement may be made within the scope of the appended claims in which it is our intention to claim all novelty as broadly as the prior art permits.

We claim:

1. A processed fibrous material impregnated with a high molecular weight polymer of isobutylene obtained by treatment with an inorganic halide at a temperature below $-10°$ C.

2. A processed fibrous material impregnated with a high molecular weight polymer of isobutylene obtained by treatment with boron fluoride at a temperature below $-10°$ C.

3. A processed fibrous material impregnated with a high molecular weight polymer of isobutylene obtained by polymerization at a temperature below $-10°$ C.

4. A processed fibrous material impregnated with a high molecular weight polymer of isobutylene.

5. A processed fibrous material impregnated with a high molecular weight hydrocarbon polymer produced by treating isobutylene with boron fluoride at temperatures below $-10°$ C.

6. A processed fibrous material according to claim 5 containing 0.01 to 10% of the polymer.

7. An impregnated processed fibrous material according to claim 5, in which insecticides and fungicides are introduced with the polymer.

8. A processed fibrous material impregnated with a polymer of isobutylene of 5,000 to 10,000 molecular weight.

9. A processed fibrous material with a surface coating of a polymer of isobutylene of 1,000 to 5,000 molecular weight.

10. A process of impregnating a fibrous material with a polymer of isobutylene of high molecular weight, which comprises immersing a fibrous material in a bath containing a high molecular weight polymer of isobutylene obtained by polymerization at a temperature below $-10°$ C. in solution in a solvent, maintaining the fibrous material in the bath for a period of time suitable to impregnate the inside fibers of the fibrous material, removing the fibrous material from the bath and removing the solvent from the fibrous material by subjecting said material to the action of heat.

11. A process of impregnating a fibrous material with a polymer of isobutylene of high molecular weight, according to claim 10, in which a vacuum is used to remove the solvent.

12. A process of impregnating a fibrous material according to claim 10, in which the volatile solvent used is non-inflammable.

13. A process of impregnating a fibrous material according to claim 10, in which insecticides and fungicides are also in solution in the solvent.

14. A process of manufacturing waterproof fabrics which comprises coating a material with a 20% solution of a high molecular weight polymer of isobutylene, allowing the solvent to partially evaporate, and then covering the coated surface with another fibrous material.

15. A process of rendering a fibrous material non-skid which comprises coating the surface of the fibrous material which comes in contact with other materials with a high molecular weight polymer of isobutylene.

16. A process of rendering fibrous material non-skid according to claim 15, in which the polymer is dissolved in the solvent and used in concentrations above 20%.

17. Cordage material impregnated with a high molecular weight polymer of isobutylene.

18. Wood impregnated with a high molecular weight polymer of isobutylene.

19. Asbestos impregnated with a high molecular weight polymer of isobutylene.

PER K. FROLICH.
PETER J. WIEZEVICH.